United States Patent
Barrenscheen et al.

(10) Patent No.: US 9,831,782 B2
(45) Date of Patent: Nov. 28, 2017

(54) SWITCHED MODE POWER SUPPLY WITH SECONDARY-SIDE POWER REGULATION

(71) Applicant: Infineon Technologies Austria AG, Villach (AT)

(72) Inventors: Jens Barrenscheen, Munich (DE); Anthony Sanders, Wiessenfeld (DE); Pierrick Ausseresse, Munich (DE)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 0 days.

(21) Appl. No.: 15/003,618

(22) Filed: Jan. 21, 2016

(65) Prior Publication Data

US 2016/0233775 A1 Aug. 11, 2016

Related U.S. Application Data

(60) Provisional application No. 62/114,404, filed on Feb. 10, 2015.

(51) Int. Cl.
*H02M 1/08* (2006.01)
*H02M 3/335* (2006.01)
*H02M 1/00* (2006.01)

(52) U.S. Cl.
CPC .............. *H02M 3/33523* (2013.01); *H02M 2001/0025* (2013.01)

(58) Field of Classification Search
CPC . H02M 1/08; H02M 3/33507; H02M 3/33546
USPC .............. 363/21.04, 21.07, 21.12, 21.15, 97
See application file for complete search history.

(56) References Cited

U.S. PATENT DOCUMENTS

| 4,683,528 | A | * | 7/1987 | Snow | H02M 3/33523 363/21.15 |
| 5,498,995 | A | * | 3/1996 | Szepesi | H02M 3/33507 327/101 |
| 5,745,358 | A | * | 4/1998 | Faulk | H02M 3/33523 363/21.13 |
| 8,374,004 | B2 | * | 2/2013 | Sutardja | H02M 3/33538 363/131 |
| 2011/0222318 | A1 | * | 9/2011 | Uno | H02M 1/4225 363/21.05 |
| 2012/0099345 | A1 | | 4/2012 | Zhao et al. | |
| 2013/0088898 | A1 | | 4/2013 | Gao et al. | |
| 2013/0235620 | A1 | | 9/2013 | Morris et al. | |

(Continued)

*Primary Examiner* — Jeffrey Sterrett
(74) *Attorney, Agent, or Firm* — Slater Matsil, LLP (57) ABSTRACT

It is possible to achieve more precise power regulation in switched mode power supply systems by performing at least some control-loop processing on the secondary-side of the transformer. In particular, a secondary-side measurement is processed at least partially by a secondary-side controller to obtain a switching indication signal. The switching indication signal is then communicated from the secondary-side controller to a primary-side controller, where it is used to regulate the amount of energy applied to the primary winding. The switching indication signal may be any control signaling instruction that prompts the primary-side controller to regulate and/or modify the power applied to the primary winding. The switching indication signal may be communicated over an isolating signal path, such as a single-ended capacitive coupler, a differential capacitive coupler, an inductive coupler, or an opto-coupler.

18 Claims, 8 Drawing Sheets

(56) References Cited

U.S. PATENT DOCUMENTS

| | | | |
|---|---|---|---|
| 2013/0250627 A1 | 9/2013 | Herfurth | |
| 2014/0036550 A1* | 2/2014 | Yang | H02M 3/33523 |
| | | | 363/21.12 |
| 2014/0078789 A1* | 3/2014 | Li | H02M 3/33523 |
| | | | 363/21.15 |
| 2014/0133186 A1 | 5/2014 | Balakrishnan et al. | |
| 2014/0160810 A1 | 6/2014 | Zheng | |
| 2014/0192566 A1* | 7/2014 | Yang | H02M 3/33523 |
| | | | 363/21.15 |
| 2014/0204623 A1* | 7/2014 | Djenguerian | H02M 1/36 |
| | | | 363/21.12 |
| 2014/0254215 A1 | 9/2014 | Brinlee et al. | |
| 2015/0109832 A1* | 4/2015 | Heo | H02M 3/33507 |
| | | | 363/21.18 |
| 2015/0214826 A1* | 7/2015 | Wahby | H02M 3/33507 |
| | | | 363/21.01 |
| 2016/0190938 A1* | 6/2016 | Wang | H02M 3/33507 |
| | | | 363/21.12 |
| 2016/0359419 A1* | 12/2016 | Lin | H02M 1/08 |

* cited by examiner

SWITCHED MODE POWER SUPPLY WITH SECONDARY-SIDE POWER REGULATION

This patent application claims priority to U.S. Provisional Application No. 62/114,404, filed on Feb. 10, 2015 and entitled "System and Method for Secondary-Side Power Regulation," which is hereby incorporated by reference herein as if reproduced in its entirety.

TECHNICAL FIELD

The present invention relates generally to power devices, and in particular embodiments, to systems and methods for secondary-side power regulation.

BACKGROUND

Power supply systems are pervasive in many electronic applications from computers to automobiles. Generally, voltages within a power supply system are generated by performing a DC-DC, DC-AC, and/or AC-DC conversion through operation of a switch loaded with an inductor or transformer. One class of such systems includes switched mode power supplies (SMPS). An SMPS is usually more efficient than other types of power conversion systems because power conversion is performed by controlled charging and discharging of the inductor or transformer and reducing energy lost due to power dissipation across resistive voltage drops.

In some applications, a load on a secondary-side of a power supply may fluctuate dynamically over time, in which case it may be desirable to regulate the primary-side to provide different amounts of power in order to compensate for the changing load conditions. Conventional power supplies achieve this by sending a feedback signal indicating a secondary-side measurement (e.g., voltage, current, etc.) to a primary-side controller. This measurement is then processed at the primary-side controller to determine an appropriate pulse width and switching cycle for regulating the primary-side of the transformer.

SUMMARY OF THE INVENTION

Technical advantages are generally achieved, by embodiments of this disclosure which describe to systems and methods for secondary-side power regulation.

In accordance with an embodiment, a method for power regulation by a primary-side controller is provided. In this example, the method includes regulating a power applied to a primary winding of a transformer in a power supply system during a first period, receiving a switching indication from a secondary-side controller of the transformer, and modifying the power applied to the primary winding during a second period based on the switching indication.

In accordance with another embodiment, a primary-side controller is provided. In this example, the primary-side controller includes a primary-side switching controller configured to regulate a power applied to a primary winding in a transformer during a first period, and an input interface coupled to the primary-side switching controller. The input interface is configured to receive a switching indication from a secondary-side controller of the transformer, and to provide the switching indication to the primary-side switching controller. The primary-side switching controller is further configured to modify the power applied to the transformer during a second period based on the switching indication received from the secondary-side controller.

In accordance with yet another embodiment, an apparatus having a primary-side controller and a secondary-side controller coupled to the primary-side controller is provided. In this example, the secondary-side controller is adapted to monitor a parameter of a secondary-side power system, and to generate a switching indication based on the parameter of the secondary-side power system. The primary-side controller is adapted to receive the switching indication from the secondary-side controller, and to regulate a power applied to a primary winding of the transformer based at least in part on the switching indication.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Notably, the integrity of the secondary-side measurement may be affected by distortion as the feedback signal is transferred from the secondary-side to the primary-side, thereby reducing the overall accuracy of the power regulation. As such, techniques for performing at least some control-loop processing on the secondary-side are desired to achieve more precise transformer power-regulation.

Aspects of this disclosure provide techniques for performing at least some control-loop processing on the secondary-side of a transformer to provide more precise power regulation. Specifically, the secondary-side measurement is processed at least partially by a secondary-side controller to obtain a switching indication signal. The switching indication signal is then communicated from the secondary-side controller to a primary-side controller, where it is used to regulate the amount of energy applied to the primary winding. The switching indication signal may be any control signaling instruction that prompts the primary-side controller to regulate and/or modify the power applied to the primary winding, e.g., a pulse width modulated (PWM), etc. The switching indication signal may be communicated over an isolating signal path, such as a single-ended capacitive coupler, a differential capacitive coupler, an inductive coupler, an opto-coupler, a giant magnetoresistance (GMR) sensor, or any other component (or collection of components) adapted to isolate the secondary-side of the transformer from the primary-side of the transformer.

Figure 1:
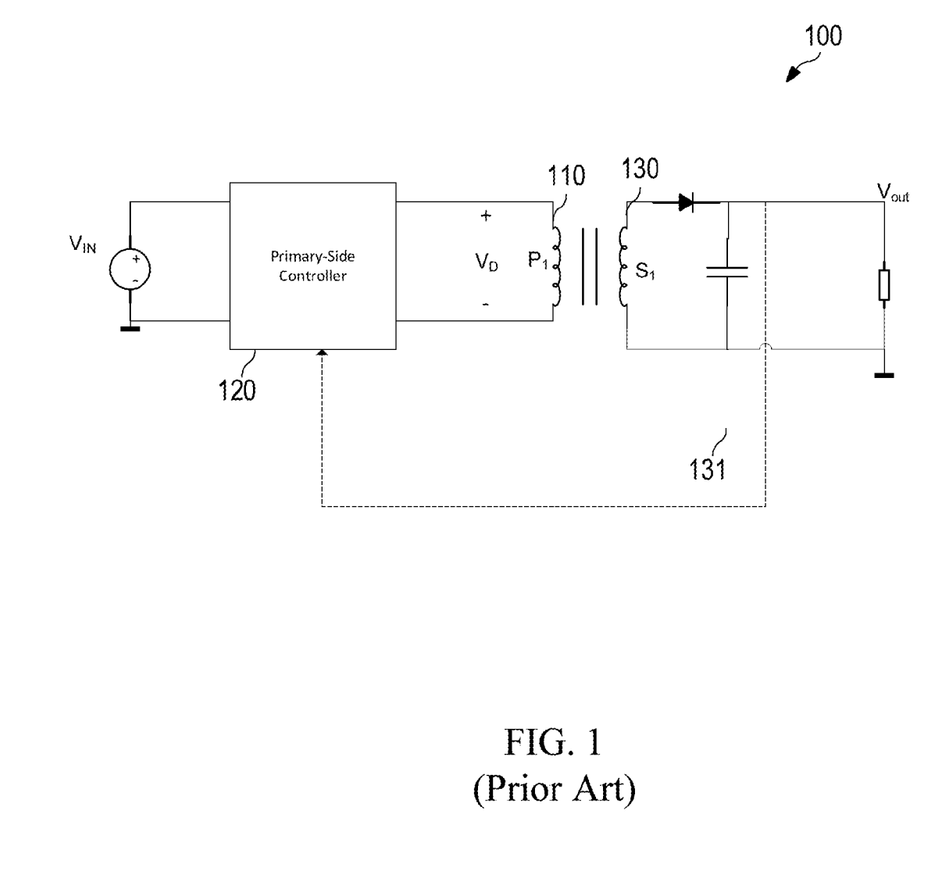
FIG. 1 illustrates a diagram of a conventional power supply system adapted for primary-side control-loop processing.

FIG. 1 illustrates a conventional power supply system 100 adapted for primary-side control-loop processing. As shown, the conventional power supply system 100 includes a transformer having a primary winding 110 and a secondary winding 130, and a primary-side controller 120. The primary-side controller 120 is adapted to regulate the power applied to the primary winding 110 based on a measurement signal 131. The measurement signal 131 may indicate an output voltage or output current of the secondary winding 130, and may be fed back from the secondary-side to the primary-side over a feedback path. Notably, transporting the measurement signal 131 over the feedback path may affect the accuracy of the measurement signal 131 during control-loop processing at the primary-side controller 120, thereby reducing the precision of power regulation by the primary-side controller 120.

Figure 2:
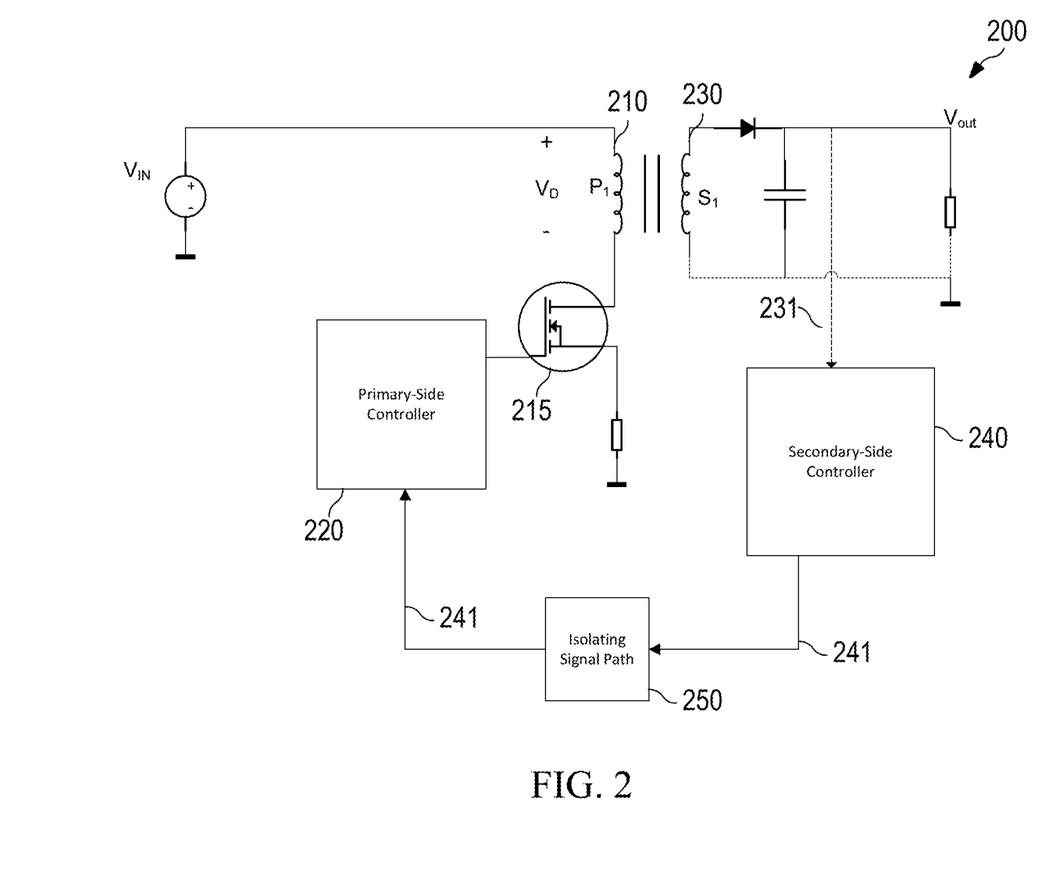
FIG. 2 illustrates a diagram of an embodiment power supply system adapted for at least partial secondary-side control-loop processing.

Aspects of this disclosure provide more precise power regulation by performing at least some of the control-loop processing at the secondary-side of the transformer. FIG. 2 illustrates an embodiment power supply system 200 in which at least some control-loop processing is performed by a secondary-side controller 240. As shown, the embodiment power supply system 200 comprises a transformer having a primary winding 210 and a secondary winding 230, a primary-side activation switch 215, a primary-side controller 220, the secondary-side controller 240, and an isolating signal path 250.

In this example, the secondary-side controller 240 receives a measurement signal 231 corresponding to a parameter (e.g., output voltage, output current, etc.) of the power system fed by secondary winding 230. The power system may comprise rectifier element(s), buffer capacitors, temperature sensors, or other filter elements. The load is connected to the output terminals of the power system. The secondary-side controller 240 then performs at least some control-loop processing on the measurement signal 231 to generate a switching indication signal 241, which is forwarded to the primary-side controller 220 via the isolating signal path 250. The isolating signal path 250 may be any component that isolates the primary-side of the embodiment power supply system 200 from the secondary-side of the power supply system 200.

The switching indication signal 241 may be any control signaling instruction that prompts the primary-side controller 220 to modify the power applied to the primary winding 210. In one example, the switching indication signal 241 prompts the primary-side controller 220 to regulate the length of a switching cycle of the primary winding 210 through manipulation of the primary-side activation switch 215. As discussed herein, the term "switching cycle" broadly refers to any parameter (e.g., interval, period, etc.) that affects the power applied to the primary winding 110. For example, a switching cycle of the primary winding 215 may consist of different parts, e.g. one part may correspond to a charging interval of the primary winding 215, another part may correspond to a discharging interval of the primary winding 215, or a switching interval of the primary winding 215, e.g., a combined length of the charging and discharging intervals when the charging interval is fixed. In another example, the switching indication signal 241 is a pulse width modulated (PWM) signal that prompts a primary-side timing controller to activate/deactivate a gate-driver driving the primary-side activation switch 215. As another example, the switching indication signal 241 may be a request to enter a new burst mode. In another embodiment, the switching indication signals triggers the start of a new switching cycle of the primary-side controller. In such an embodiment, the primary side controller may define the length of the charging interval of the primary side winding, and the secondary-side controller may define the length of the discharging interval. In another embodiment, the frequency or duty cycle of the switching indication signal is used by the primary-side controller to modify the timing of the switching cycle (to modify the amount of energy transferred from primary side to secondary side).

Figure 3:
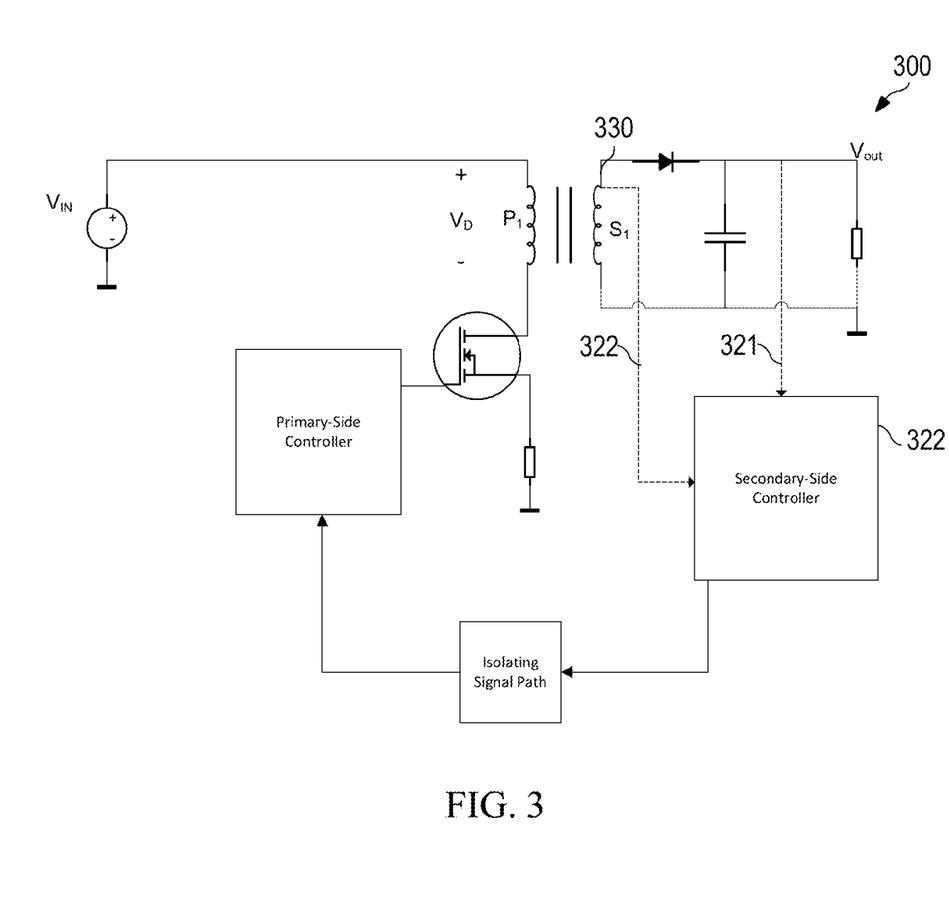
FIG. 3 illustrates a diagram of another embodiment power supply system adapted for at least partial secondary-side control-loop processing.

In some embodiments, secondary-side controllers will receive multiple measurement and/or timing signals. FIG. 3 illustrates an embodiment power supply system 300 in which a secondary-side controller 340 receives a measurement signal 321 and a timing signal 322. The timing signal 323 may indicate a charging/discharging interval of the secondary winding 330. In one embodiment, the secondary-side controller receives information regarding a shape of the voltage over switch 215, and outputs the switching indication signal with a defined timing relation to the voltage shape (e.g., voltage over the secondary side winding contains an image of that voltage shape after the current through the winding has reached 0).

Figure 4:
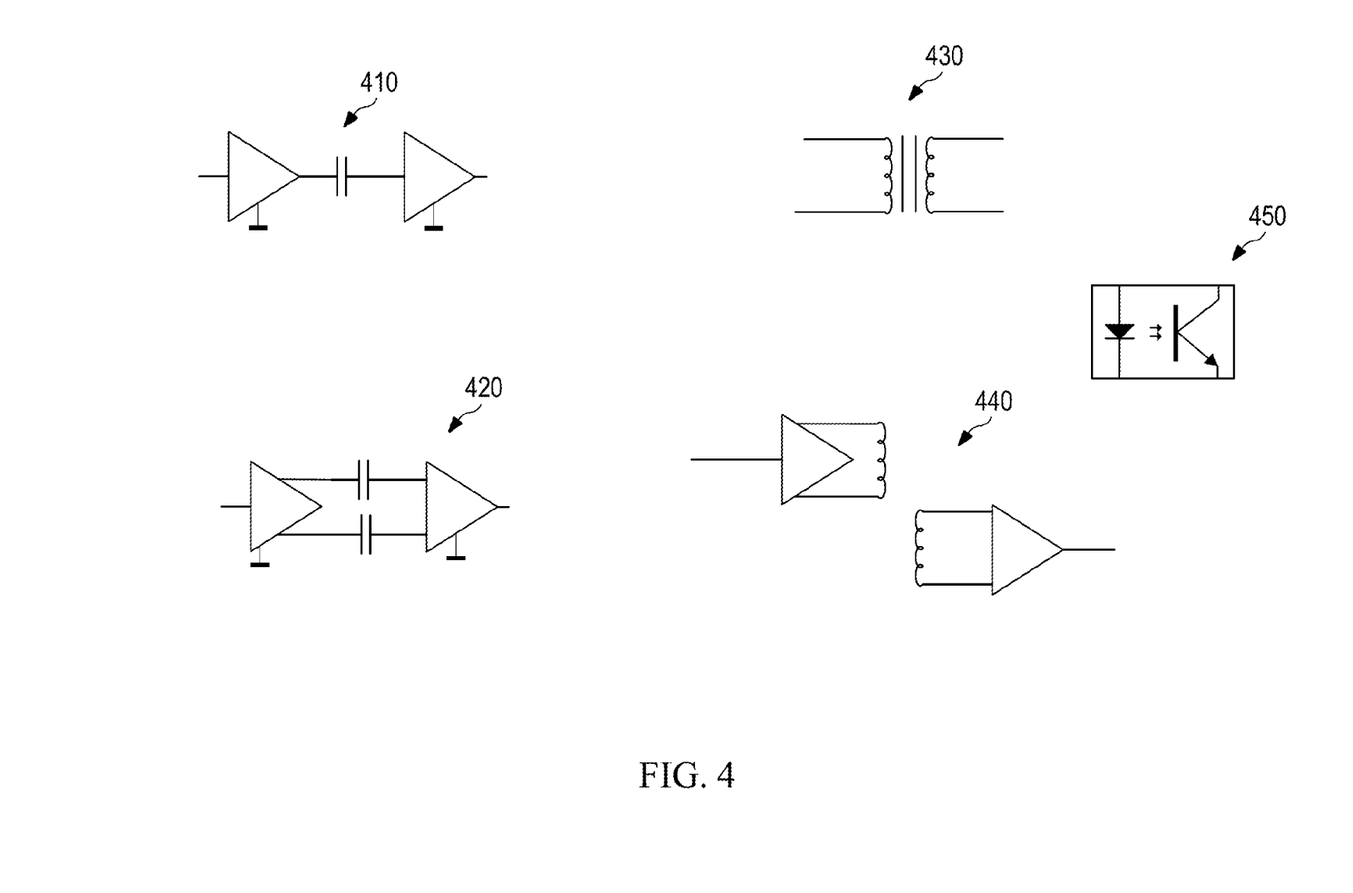
FIG. 4 illustrates diagram of embodiment isolating signal paths.

Primary-side controllers may be isolated from secondary-side controllers via an isolating signal path. FIG. 4 illustrates a plurality of embodiment isolating signal paths 410-450 for isolating primary-side controllers from secondary-side controllers. As shown, the isolating signal path 410 comprises a single-ended capacitive coupler, the isolating signal path 420 comprises a differential capacitive coupler, the isolating signal path 430 comprises a inductive coupler, the isolating signal path 440 comprises a coreless transformer (e.g., an inductive coupler without a core), and the isolating signal path 450 comprises an opto-coupler. Alternatively, other circuits and systems that implement isolating signal paths may be used.

Figure 5:
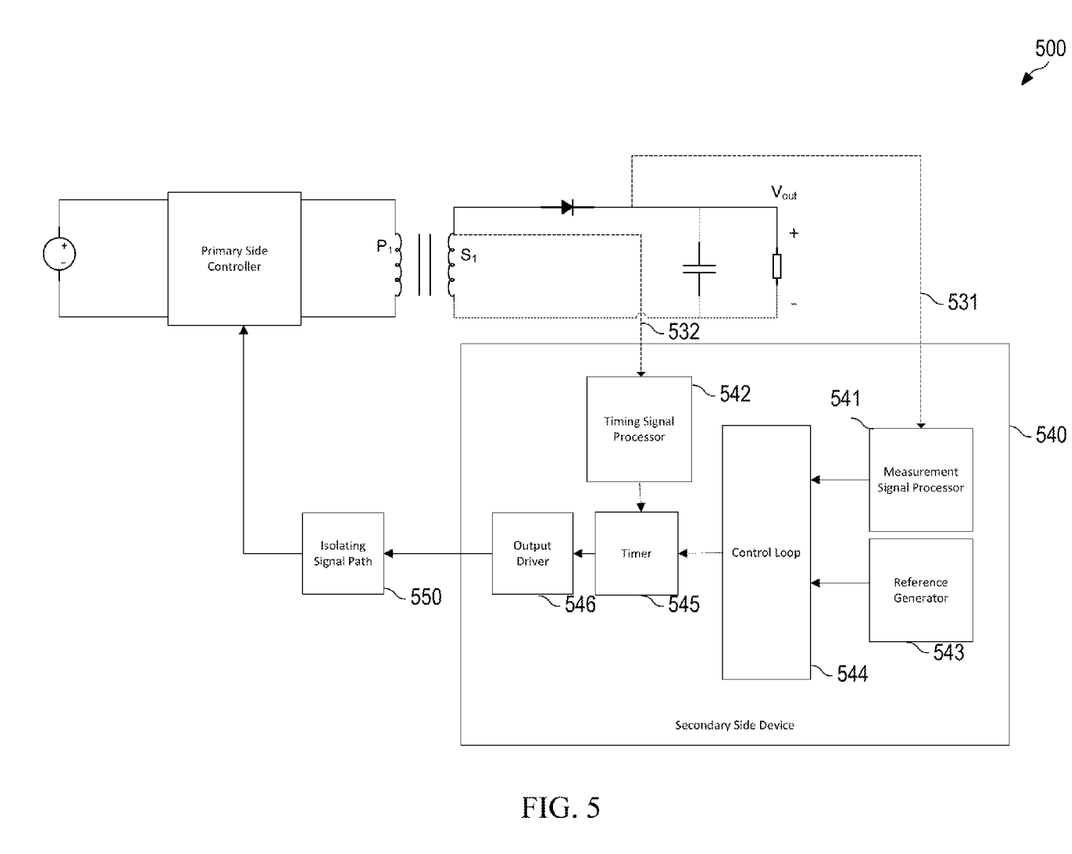
FIG. 5 illustrates a diagram of an embodiment secondary-side controller.

Aspects of this disclosure provide secondary-side controller architectures for performing at least some control-loop processing for transformer power regulation. FIG. 5 illustrates an embodiment secondary-side controller 540 adapted to perform control loop processing in a power supply system 500. As shown, the embodiment secondary-side controller 540 comprises a measurement signal processor 541, a reference signal generator 543, a control loop processor 544, a timer 545, and an output driver.

The measurement signal processor 541 processes the secondary-side measurement 531, and provides a signaling instruction to the control loop processor 544. The reference signal generator 543 provides a reference signal to the control loop processor.

Figure 6:
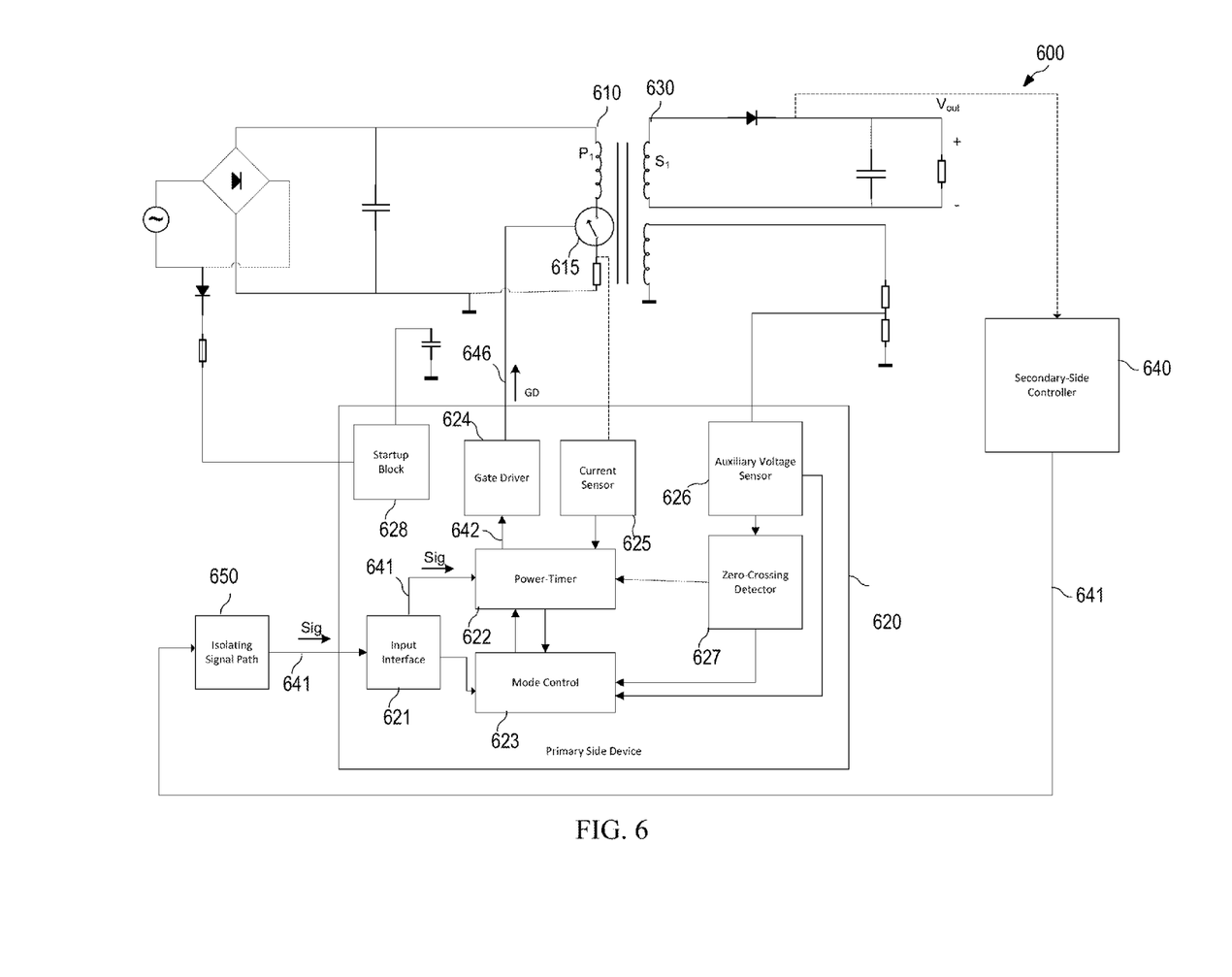
FIG. 6 illustrates a diagram of an embodiment primary-side controller.

Aspects of this disclosure also provide primary-side controller architectures for regulating a switching cycle of a primary winding based on a switching indication signal received from a secondary-side controller. FIG. 6 illustrates an embodiment primary-side controller 620 adapted to facilitate secondary-side control loop processing in a power supply system 600. As shown, the embodiment primary-side controller 620 comprises an input interface 621, a power timer 622, a mode controller 623, a gate driver 624, a current sensor 625, an auxiliary voltage sensor 626, a zero-crossing detector 627, and a startup block 628. The input interface 621 may be any component adapted to receive a switching indication signal 641 from the secondary-side controller 640 (either directly or via an isolating signal path 650), and forward the switching indication signal 641 to the power timer 622 and the power mode controller 623.

The power timer 622 be any component adapted to supply a signal 642 (e.g., a PWM signal) to the gate-driver 624. The gate driver 624 may be any component adapted to generate a control signal 646 for activating/de-activating the primary-side activation switch 615. The Current sensor 625 may detect a current through the primary winding 610, and the auxiliary voltage sensor may detect an auxiliary winding voltage. The auxiliary winding voltage may contain an image of the voltage over the primary and the secondary windings. The zero crossing detector 627 may detect when the auxiliary winding voltage is at or near a zero voltage condition. A zero crossing of the auxiliary winding voltage may indicate when the voltage over switch 615 goes towards its minimum value.

During some operating modes (e.g., normal operating modes, burst operating modes, etc.), the power timer 622 may use the switching signal 641 to regulate the switching cycle of the primary winding 610. During other operating modes (e.g., startup mode, etc.), the power timer 622 may use signals received from the current sensor 625 and/or zero-crossing detector 627 to regulate the switching cycle of the primary winding 610. The mode controller 623 may select which operating mode the primary-side controller 620 operates in based on, inter alia, the switching indication signal 641 received over the input interface 621 and signals received from the auxiliary voltage sensor 626 and/or the zero-crossing detector 627.

Figure 7:
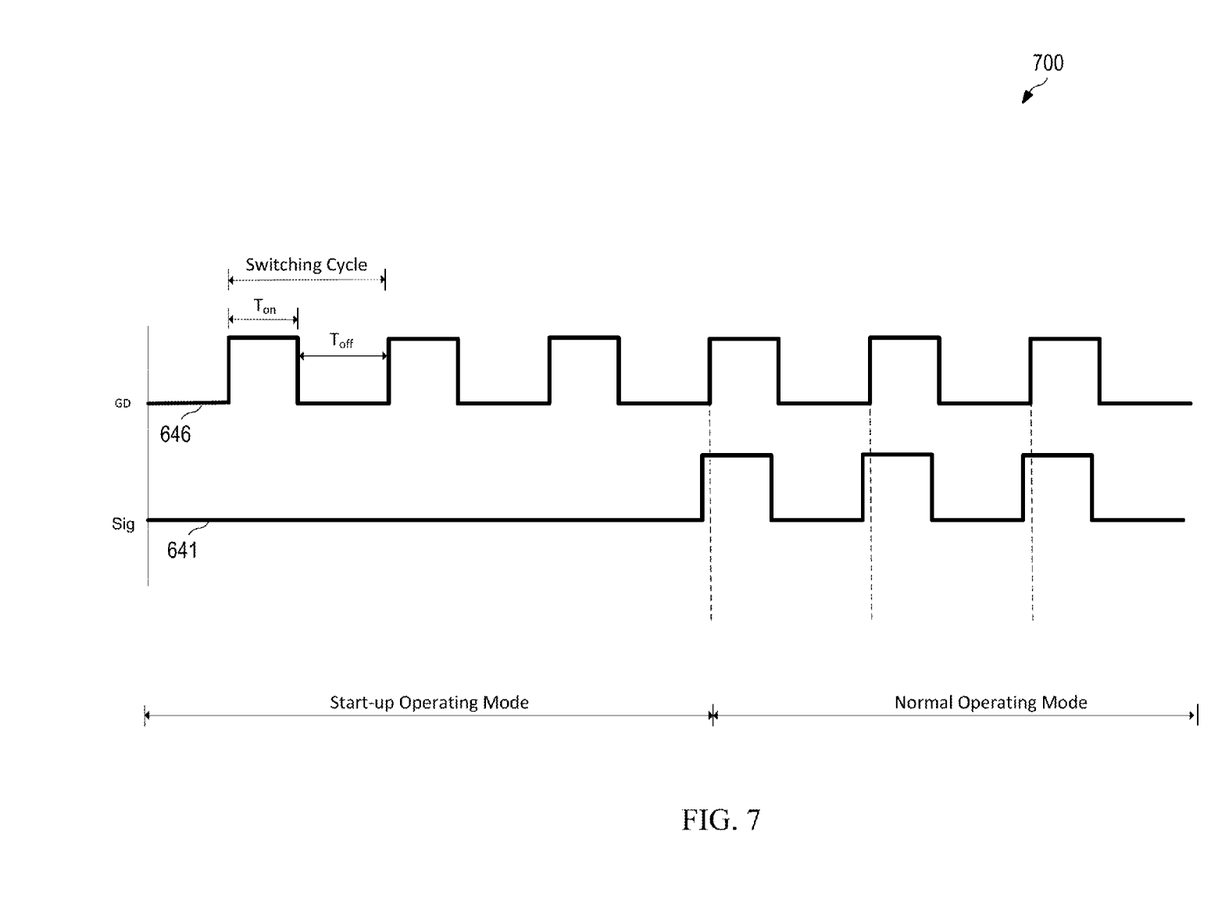
FIG. 7 illustrates a diagram of an embodiment timing diagram of a power supply system adapted for at least partial secondary-side control-loop processing.

In one embodiment, the primary-side controller 620 operates in a start-up mode when the power supply system 600 is initially turned on, and in a normal operating mode when the secondary winding 630 is experiencing normal loading conditions. FIG. 7 illustrates a timing diagram 700 of an embodiment switching cycle of the power supply system 600 during start-up and normal operating modes. As shown, the signal 642 is generated by the primary-side controller based on pre-configured activation (Ton) and deactivation (Toff) intervals. This allows the secondary-side controller 640 to gradually power up. Upon receiving sufficient power, the secondary-side controller 640 begins providing the switching indication signal 641, which transitions the primary-side controller 620 from the start-up mode to the normal operating mode. During the normal operating mode, the primary-side controller 620 generates the signal 642 based on the switching indication signal 641.

Startup mode may provide power regulation when the transformer is initially turned on, as it may take the secondary-side controller 640 some time to power up. When operating in the start-up mode, the primary-side controller 620 may regulate the switching cycle of the primary winding 610 based on signals received from the current sensor 625 and the zero crossing detector 627. In one example, the primary-side controller 620 may start the energy transfer autonomously in a quasi-resonant fashion based on a measurement corresponding to the secondary-side of the transformer, e.g., a voltage at the auxiliary winding, etc.

The primary-side controller 620 may regulate the primary winding 610 to provide a start-up output voltage (or startup operation set point) when operating in the startup mode. The start-up output voltage may be slightly less than a normal target output voltage in order to avoid overshooting the nominal (or steady-state) output power, as well as to ensure that the secondary-side controller 640 receives enough power to eventually transition into full or partial secondary-side control loop processing. When approaching or reaching the startup output voltage, the primary-side controller may modify the switching cycle, e.g., increase the length of the discharging interval, to regulate the output power at steady state until receiving the switching indication signal 641 from the secondary-side controller 640. This allows for a smooth transition from primary-side control to secondary-side control. Once the secondary-side controller 640 has powered up and begun providing the switching indication signal 641, the primary-side controller 620 may transition into the normal operating mode.

In some embodiments, the primary side and the secondary side may refer to different reference or ground potentials. The isolating signal path 650 may allow for information to be exchanged between devices referring to different potentials. The isolating signal path 650 allows the transfer of information for both switching on and switching off the primary-side activation switch 615. In such embodiments, the secondary-side controller 640 can take full control of the switching cycle of the primary winding 610, although the current sensor 625 may provide an Ipeak mechanism as emergency switch off criterion (e.g. in case of a short-circuit) during the normal operating mode.

In other embodiments, the isolating signal path 650 is only capable of transferring a request to start a new switching cycle. In such embodiments, the secondary-side controller may control the start of the charging interval of the primary winding 610, and the primary-side controller 620 may control the start of the discharging interval of the primary winding 610 based on an energy demand of the secondary-side. As the secondary-side demands more or less energy, the primary-side controller 620 may gradually lengthen or shorten the charging interval of the primary winding. Furthermore, the primary-side controller 620 can slowly adapt the charging interval to optimize zero voltage switching.

The primary-side controller may monitor the shape of the auxiliary winding, especially the zero-crossings. An efficient activation of the primary side switch 215 may be achieved when the voltage over the primary side switch is equal to or less than a voltage threshold (e.g., valley switching). That voltage threshold can be derived from the timing of the zero-crossings.

In one embodiment, if the switching indication delivered by the secondary-side controller does not match with the valley switching, the primary-side controller may modify amount of energy transferred to the secondary side, e.g. by modifying the length of the charging interval of the primary winding, to achieve valley switching.

When the secondary-side is experiencing light load conditions, the primary-side controller 620 may transition into a burst mode. During burst mode, the primary-side controller 620 alternates between phases of active energy transfer (active burst phase) and phases without energy transfer (burst pause phase). During the active burst phase, the capacitances on the secondary-side are loaded. This energy is then used to power the secondary-side circuitry during the burst pause phase. Burst mode may be used when the energy demand is small. As a result, during the active burst phase, the primary-side delivers more energy than actually needed by the secondary-side. This energy is then consumed during the burst pause.

Conventional bust mode techniques require the primary-side controller to measure the secondary-side output voltage from time to time to determine when to transition from burst pause to active burst, as may occur when the secondary-side load spikes or when the secondary winding's output voltage has fallen below a defined threshold. Aspects of this disclosure avoid this issue by allowing the secondary-side controller to request the start of a new switching cycle. As a result, the switching activity in normal mode and in burst mode is defined by the secondary-side. In some embodiments, the primary-side controller may initiate a new switching cycle (or enter a power saving mode) when the primary-side device does not receive a request for a new switching cycle start within a defined time range. In some embodiments, the primary-side device initiates a new active burst phase when a secondary-side request is not received within a timeout period to allow the secondary-side to reload its capacitances. This may allow secondary-side requests to be used primarily to indicate a load spike on the secondary-side, thereby reducing the frequency of such requests (and potentially saving power). In such embodiments, the output power may be regulated at a constant value during the periodic active bursts phases. During requested burst phases, the output power value may be determined based on the secondary side request. For example, when a secondary-side requests a time-off (Toff) that is smaller than the defined time range (or time-out period), the primary-side device may assume a load jump has occurred, and may increase Ton/Ipeak to deliver more energy.

Transients occurring after load changes may lead to significant changes in the switching cycle. This can be interpreted as load jump on the secondary-side by the primary-side device and the Ton/Ipeak values can be adapted automatically. In one embodiment, the change in Ton/Ipeak can be derived from the change in the Toff value. In another embodiment, the change in Ton/Ipeak can be handled in defined steps.

It may be possible to handle the Ton/Ipeak definition on the primary-side based on the requests from the secondary-side, and to adapt the Ton/Ipeak setting depending on the actual operating mode. In one embodiment, the secondary-side only requests the start of a new switching cycle from the primary-side, which handles Ton/Ipeak autonomously. In another embodiment, the secondary-side requests the start of a new switching cycle from the primary-side, and also transfers information to the primary-side to modify the Ton/Ipeak. In yet another embodiment, the secondary-side requests the activation and the deactivation of the primary-side transistor. In some embodiments, the primary-side controls the switching cycle during transformer startup, and also provides protection mechanisms, e.g., open/short detection, high voltage detection, etc.

FIG. 7 illustrates a power-up scenario of the primary-side and the secondary-side controllers, assuming that both parts start at 0 voltage. At the beginning (power supplied to primary-side controller), the primary-side controller outputs a control signal 646 activating the primary switch 215. The secondary side power system and the secondary-side controller may not yet be powered up for normal operation. Therefore, the primary-side controller regulates the parts of the switching cycle according to a control scheme defined by the primary-side controller. The control scheme may comprise monitoring the auxiliary voltage to obtain information about the voltage of the secondary-side power system. When the secondary-side controller is powered-up for operation, it starts sending switching indications to the primary-side controller according to a control scheme defined by the secondary-side controller. The control scheme may comprise monitoring at least one part of the secondary-side power system, such as an output current or an output voltage. With receiving the switching indications from the secondary-side controller, the primary-side controller changes its control scheme to include the switching indication from the secondary-side controller.

Figure 8:
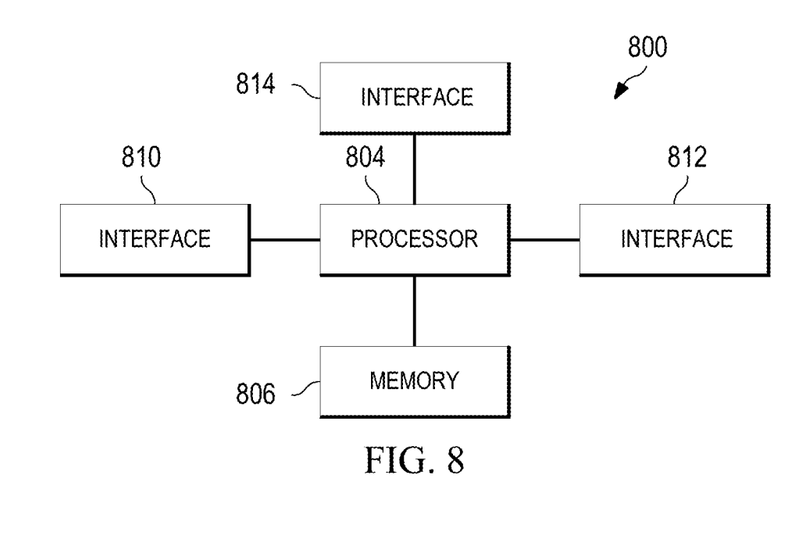
FIG. 8 illustrates a diagram of an embodiment processing system.

FIG. 8 illustrates a block diagram of a processing system 800 that may be used for implementing the devices and methods disclosed herein. The processing system 800 may include a processor 804, a memory 806, and a plurality of interfaces 810-814, which may (or may not) be arranged as shown in FIG. 8. The processor 804 may be any component capable of performing computations and/or other processing related tasks, and the memory 806 may be any component capable of storing programming and/or instructions for the processor 804. The interfaces 810-814 may be any component or collection of components that allows the processing system 800 to communicate with other systems and/or devices. The interfaces 810-814 may include serial interfaces (e.g., a Serial Peripheral Interface (SPI), Universal Serial Bus (USB), etc.), parallel interfaces, or combinations thereof.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
regulating, by a primary-side controller, a power applied to a primary winding of a transformer in a power supply system during a first period;
receiving, by the primary-side controller, a switching indication from a secondary-side controller of the transformer; and
modifying, by the primary-side controller, the power applied to the primary winding by lengthening a charging time of the primary winding if the switching indication is received earlier in a switching cycle than a previous switching indication in a previous switching cycle during a second period.

2. The method of claim 1, wherein regulating the power applied to the primary winding during the first period comprises regulating at least one part of a switching cycle of the primary winding.

3. The method of claim 2, wherein modifying the power applied to the primary winding during the second period based on the switching indication comprises:
lengthening or shortening at least one part of the switching cycle of the primary winding during the second period.

4. The method of claim 2, wherein modifying the power applied to the primary winding during the second period based on the switching indication comprises:
  receiving a modified pulse width modulated (PWM) signal from the secondary-side controller, the modified PWM signal having a different pulse width than a PWM signal provided to a primary-side switching controller during the first period; and
  providing the modified PWM signal to the primary-side switching controller, wherein the modified PWM signal prompts the primary-side switching controller to lengthen or shorten at least a part of a switching cycle of the primary winding during the second period.

5. The method of claim 4, wherein the modified PWM signal is generated directly by the secondary-side controller.

6. The method of claim 1, wherein the switching indication is received over an isolating signal path extending between the secondary-side controller and the primary-side controller.

7. The method of claim 6, wherein the isolating signal path comprises one of a single-ended capacitive coupler, a differential capacitive coupler, an inductive coupler, a giant magnetoresistance (GMR) sensor, and an opto-coupler.

8. The method of claim 1, further comprising:
  regulating the primary winding in accordance with a burst pause phase during a burst operation mode;
  receiving, by the primary-side controller, a switching indication from the secondary-side controller; and
  transitioning the primary winding from the burst pause phase to a burst activation phase in accordance with the switching indication received from the secondary-side controller.

9. A primary-side controller comprising:
  a primary-side switching controller configured to regulate a power applied to a primary winding in a transformer during a first period; and
  an input interface coupled to the primary-side switching controller, the input interface being configured to receive a switching indication from a secondary-side controller of the transformer, and to provide the switching indication to the primary-side switching controller, wherein the primary-side switching controller is further configured to modify the power applied to the transformer during a second period based on the switching indication received from the secondary-side controller by lengthening a charging time of the primary winding if the switching indication is received earlier in a switching cycle than a previous switching indication in a previous switching cycle.

10. The primary-side controller of claim 9, wherein the switching indication is received over an isolating signal path.

11. A controller comprising:
  a secondary-side controller adapted to monitor a parameter of a secondary-side power system, and to generate a switching indication based on the parameter of the secondary-side power system; and
  a primary-side controller coupled to the secondary-side controller, wherein the primary-side controller is adapted to receive the switching indication from the secondary-side controller, and to regulate a power applied to a primary winding of a transformer based at least in part on the switching indication, wherein the primary-side controller modifies at least one part of a switching cycle according to a timing of the switching indication, and the primary-side controller lengthens a charging time of the primary winding if the switching indication is received earlier in the switching cycle than a previous switching indication in a previous switching cycle.

12. The controller of claim 11, wherein the primary-side controller starts a new switching cycle upon receiving the switching indication.

13. The controller of claim 11, wherein the parameter monitored by the secondary-side controller comprises at least one of a current, a voltage, and a load.

14. The controller of claim 11, further comprising:
  an isolating signal path coupled in-between the primary-side controller and the secondary-side controller, wherein the isolating signal path is adapted to carry the switching indication from the secondary-side controller to the primary-side controller.

15. The controller of claim 14, wherein the isolating signal path comprises a capacitive coupler.

16. The controller of claim 14, wherein the isolating signal path comprises an opto-coupler.

17. The controller of claim 14, wherein the isolating signal path comprises an inductive coupler.

18. The controller of claim 17, wherein the inductive coupler comprises a coreless transformer.

* * * * *